(12) United States Patent
Glickman

(10) Patent No.: US 7,259,919 B2
(45) Date of Patent: Aug. 21, 2007

(54) THIN-PROFILE PROJECTION SYSTEM

(75) Inventor: Jeff B. Glickman, Kirkland, WA (US)

(73) Assignee: InFocus Corporation, Wilsonville, OR (US)

( * ) Notice: Subject to any disclaimer, the term of this patent is extended or adjusted under 35 U.S.C. 154(b) by 49 days.

(21) Appl. No.: 11/205,507

(22) Filed: Aug. 16, 2005

(65) Prior Publication Data
US 2007/0041100 A1    Feb. 22, 2007

(51) Int. Cl.
*G02B 13/08* (2006.01)
*H04N 9/31* (2006.01)
*G03B 21/28* (2006.01)

(52) U.S. Cl. ..................... 359/668; 348/744; 353/78

(58) Field of Classification Search ................ 359/668, 359/708, 717
See application file for complete search history.

(56) References Cited

U.S. PATENT DOCUMENTS 4,834,476 A * 5/1989 Benton ..................... 359/23

* cited by examiner

*Primary Examiner*—Ricky Mack
*Assistant Examiner*—William Choi
(74) *Attorney, Agent, or Firm*—Schwabe Williamson & Wyatt

(57) ABSTRACT

A relatively thin-profile projection display device that employs at least two anamorphic components is disclosed herein.

22 Claims, 5 Drawing Sheets

THIN-PROFILE PROJECTION SYSTEM

FIELD OF THE INVENTION

Embodiments of the invention relate generally to the field of display devices, and more particularly to projection display devices with thin-profiles.

BACKGROUND OF THE INVENTION

In recent years, there has been a trend to build display devices, such as display monitors for personal computers that have a thin-profile (i.e., shallow depth). Currently the most popular types of thin-profile or shallow-depth display monitors are liquid crystal display (LCD) or plasma display systems. Unfortunately, the prices for these types of monitors tend to rise dramatically as the screen size increases.

Rear-projection systems, which are typically less expensive than LCD or plasma systems, may be an alternative to those more expensive LCD and plasma systems. However, rear-projection systems have certain drawbacks. For example, although conventional rear-projection systems tend to have a thinner profile than cathode ray tube (CRT) systems, they tend to be substantially thicker than LCD or plasma display systems.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION OF ILLUSTRATIVE EMBODIMENTS

Illustrative embodiments of the present invention include a relatively thin-profile projection display device that includes a folded optical path and at least two anamorphic components.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

Figure 1:
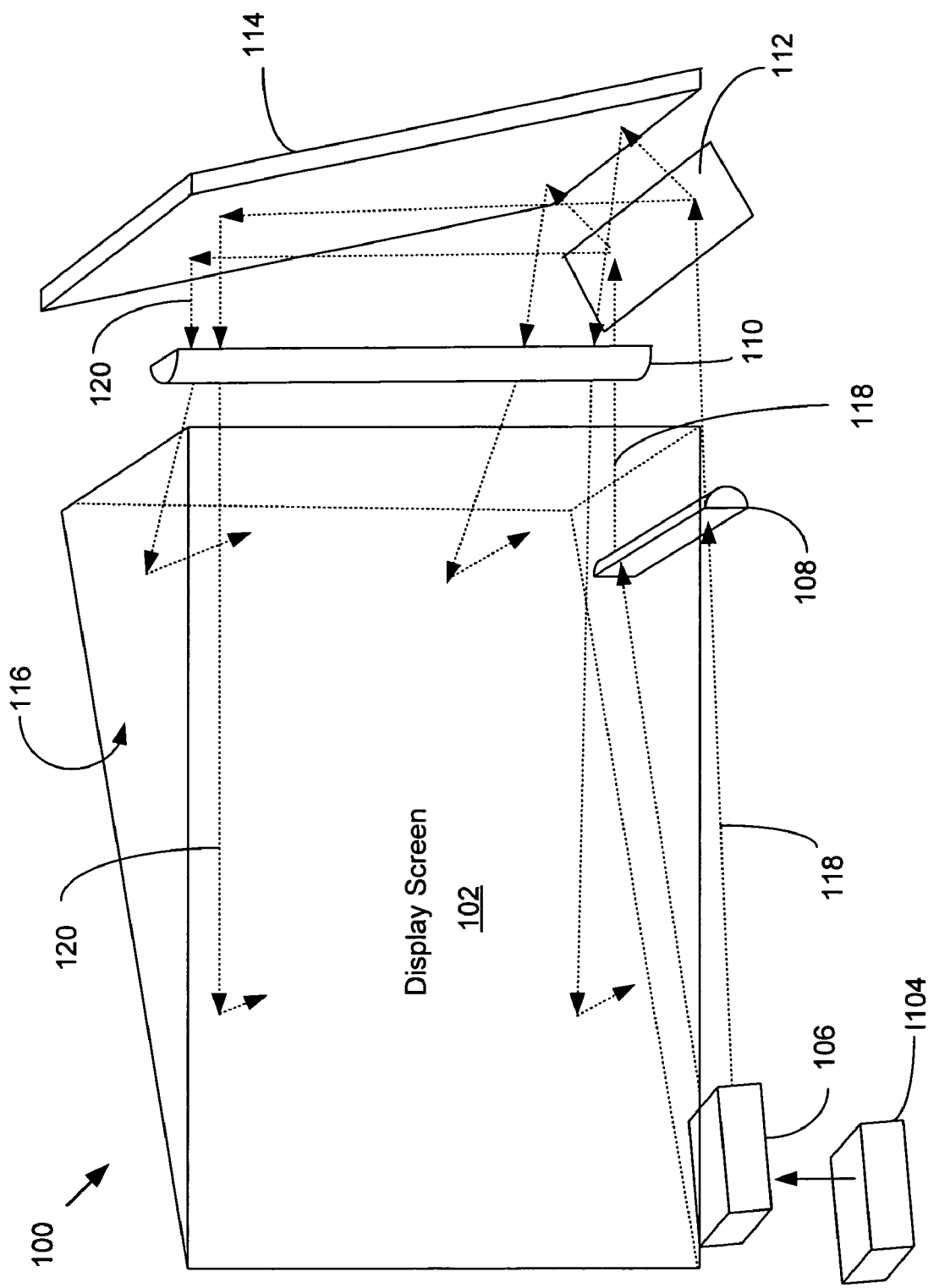
FIG. 1 illustrates a perspective view of a thin-profile projection system in accordance with some embodiments.

According to various embodiments of the invention, a relatively thin-profile projection system is disclosed herein. FIG. 1 is a perspective view of a projection system that employs two anamorphic components and assorted mirrors in accordance with some embodiments of the invention. For these embodiments, the projection system 100 may be a relatively thin-profile display system that may be built relatively inexpensively and yet produce high quality images. In some embodiments, the projection system may be used as a computer monitor. The projection system 100 may include a display screen 102, an illumination source 104, an imaging or display device (herein "light valve") 106, anamorphic components 108 and 110, and a first, a second, and a third mirror 112 to 116. Note that in other embodiments, the specific orientations and locations of the various components depicted may be different than that which is depicted in FIG. 1. Further, many other additional components or alternative components may be included in the projection system 100 of FIG. 1 in various other embodiments.

The illumination source 104 may generate light that is illuminated onto the light valve 106. For the embodiments, the illumination source 104 may include a combination of one or more light sources such as arc lamp, light emitting diodes (LEDs), laser diodes, or other light sources, a color wheel, a color switch, etc. (if an arc lamp is used as the light source), and various optics such as prisms, integrating tunnel, x-cube, and the like.

The light valve 106 may be any type of spatial light modulator such as, for example, digital micro mirror device (DMD), liquid crystal on silicon (LCOS), digital light processing (DLP) device, liquid crystal device (LCD), grating light valve, Birefringent light valve, piezoelectric light valve, or any other type of modulating device. Although not depicted, other components may be coupled to the light valve 106 such as a controller for operationally controlling the light valve 106.

The anamorphic components 108 and 110, in various embodiments, may be anamorphic lenses that stretch or expand an image in two orthogonal directions. In some embodiments, one or both of the anamorphic components 108 and 110 may each be a compound lens made up of two or more anamorphic lenses coupled together.

Operationally, the light valve 106 may generate or provide a first image by modulating the light received from the illumination source 104. In some embodiments, the first image that is provided by the light valve 106 may have an aspect ratio of 4:3 or 5:4. In other embodiments, the aspect ratio may be 16:9 or some other wide screen aspect ratio. The first image is then projected down a folded optical path that may be made up of two or more optical path segments. Initially, the first image is projected along a first segment 118 and to a first anamorphic component 108 that is disposed along the first segment 118. The first anamorphic component 108, in this case, is an anamorphic lens. As described previously, in some embodiments, the first anamorphic component 108 may be two or more anamorphic lenses that are coupled together to form a compound lens. The first anamorphic component 108 may expand or scale the first image in a first direction (in this case, vertically) that is substantially orthogonal to the first segment 118. The resulting expanded image is a second image that continues to travel down the first segment 118 until reaching the first mirror 112.

The first and second mirrors 112 and 114 may be used in combination to redirect the second image provided by the first anamorphic component 108 onto a second segment 120 of the folded optical path. The second image is then projected onto a second anamorphic component 110, which is disposed along the second segment 120. The second anamorphic component 110 like the first anamorphic component 108 may be an anamorphic lens. In some embodiments, the anamorphic lens may be two or more anamorphic lenses that are coupled together to form a compound lens. The second anamorphic component 110 may expand the second image in a second direction (in this case, horizontally) that is orthogonal to the first direction and the first segment 118 of the folded optical path. As a result of the expansion of the second image, a third image is generated. The third image will then continue traveling along the second segment 120 until it reaches a third mirror 116. The third mirror 116, which is angularly disposed behind the display screen 102, redirects the third image onto the display screen 102. In various embodiments, the third image may have the same aspect ratio as the first image projected by the light valve 106 (e.g., 4:3 or 5:4).

The orientations and locations of the anamorphic components 108 and 110 and the mirrors 112 to 116 may allow the projection system 100 to have a relatively thin profile. For example, in some embodiments in which the display screen 102 is a 24-inch screen (i.e., diagonal measurement), the depth of the projection system 100 may only be slightly over 4 inches. For these embodiments, the first anamorphic component 108 may be about 4.0 inches in long. The second anamorphic component 110, in contrast, may be about 14.4 inches long. Those skilled in the art will recognize that the specific dimensions and characteristics of the anamorphic components 108 and 110 to be employed may vary depending upon, for example, the desired screen size and aspect ratio. Further, such dimensions and characteristics may be relatively easily calculated using, for example, known algorithms and/or relationships.

Figure 2:
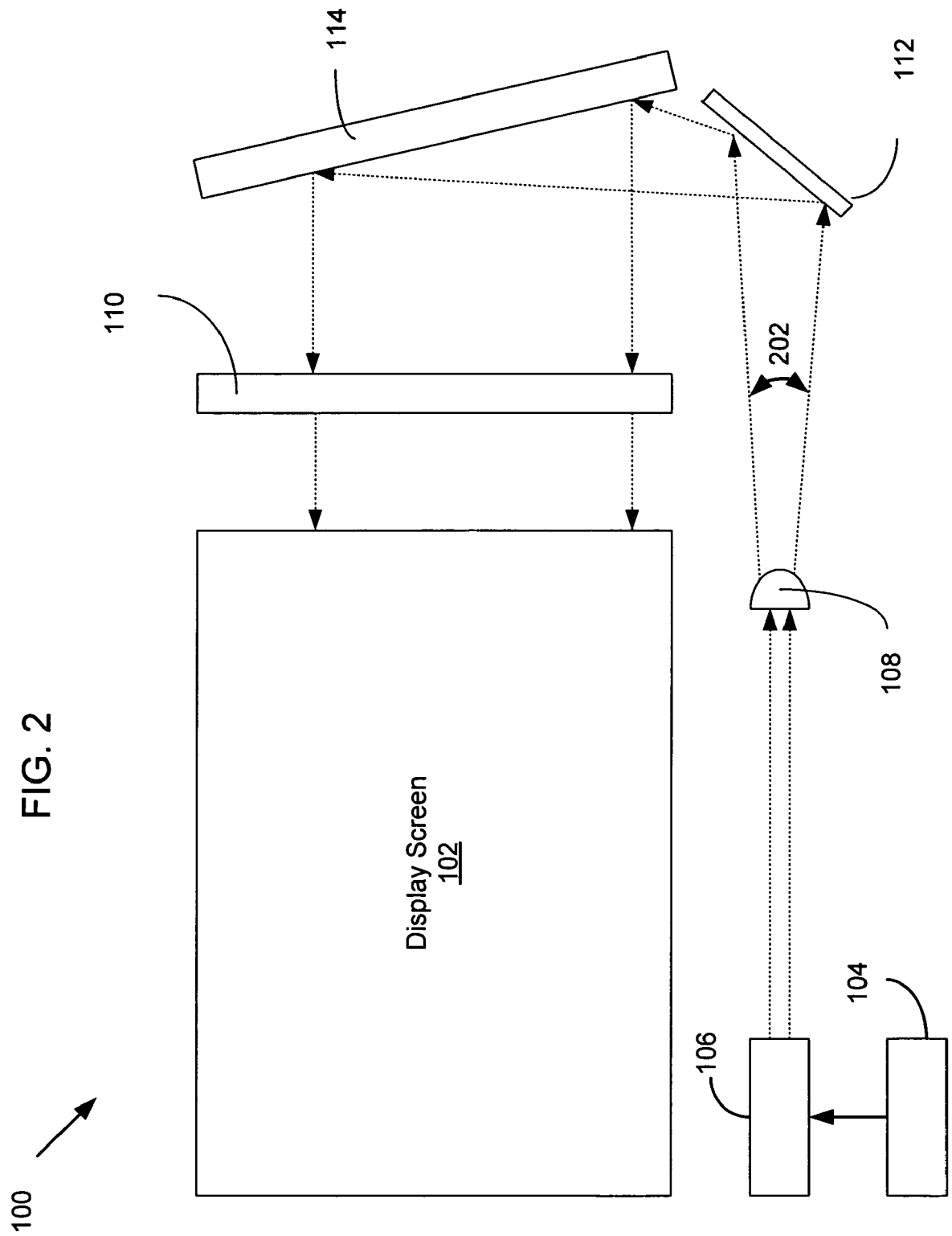
FIG. 2 illustrates a side view of the projection system of FIG. 1 in accordance with some embodiments.
Figure 3:
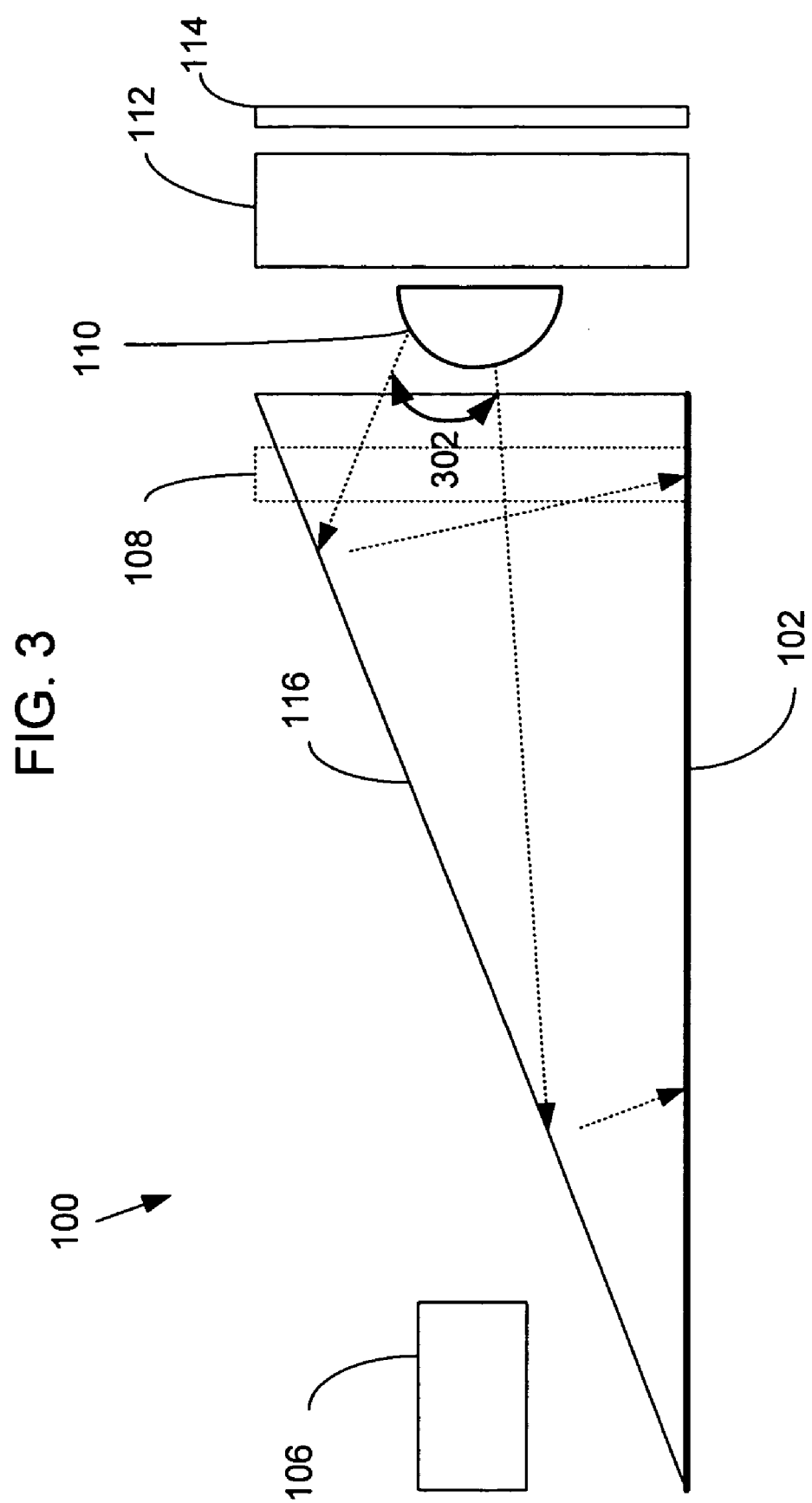
FIG. 3 illustrates a top down view of the projection system of FIG. 1 in accordance with some embodiments.

FIG. 2 is a side view of the projection system 100 of FIG. 1 in accordance with some embodiments. In this illustration, the first image provided by the light valve 106 is projected onto the first anamorphic component 108, which expands the first image in a first direction (e.g., along the vertical axis) as indicated by ref. 202. The expanded first image forms a second image, which is redirected to the second anamorphic component 110 via first and second mirrors 112 and 114. FIG. 3 is a top down view of the projection system 100 of FIG. 1. In this illustration, the expansion of the second image in a second direction (e.g., along the horizontal axis) by the second anamorphic component 110 is depicted by ref. 302. The expanded second image forms a third image, which is projected onto the display screen 102 via a third mirror 116. Note that in FIG. 3, first mirror 112, as indicated by skipping lines, lies underneath the second mirror 114. Note further that the dimensions of the components depicted in FIG. 3 as well as those depicted in the other figures may not be accurately drawn to scale and are only provided in order to appreciate certain aspects of various embodiments.

Figure 4:
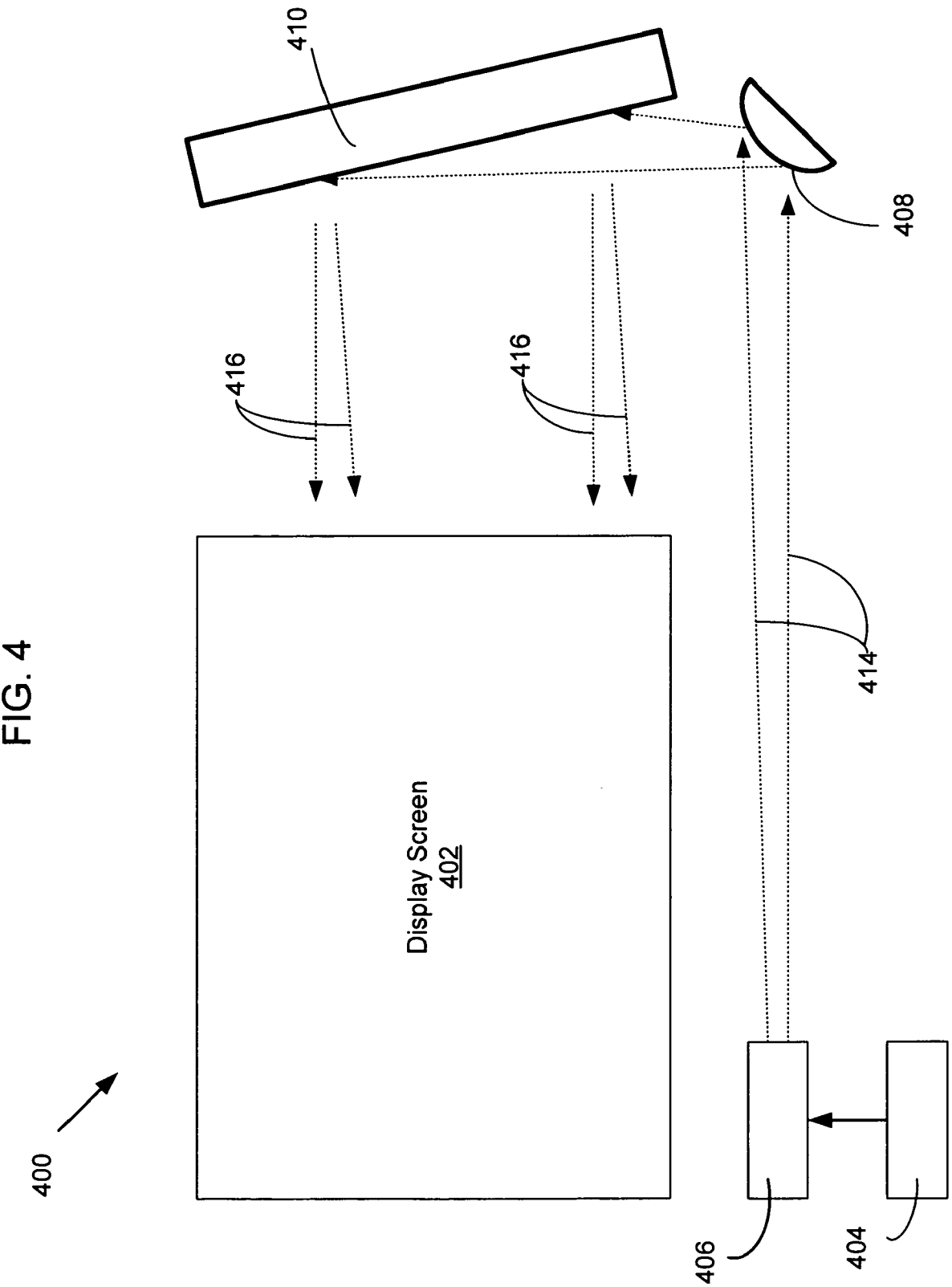
FIG. 4 illustrates a thin-profile projection system that employs curved mirrors in accordance with some embodiments.

Although the anamorphic components 108 and 110 in the above illustrations were depicted as being anamorphic lenses, in other embodiments other types of devices may be used in place of the anamorphic lens. For example, in some embodiments, curved mirrors may be used as the anamorphic components. FIG. 4 is a side view of a thin-profile projection system that employs two curved mirrors in accordance with some embodiments. For the embodiments, the projection system 400 includes a display screen 402, an illumination source 404, a light valve 406, two anamorphic components 408 and 410 that are, in this case, curved mirrors and a flat mirror 412 (see FIG. 5), which is disposed behind the display screen 402. As in the projection system 100 of FIGS. 1 to 3, the light valve 406 provides an image that may be projected along a folded optical path. Disposed along the folded optical path are the two anamorphic components 408 and 410 (curved mirrors).

Figure 5:
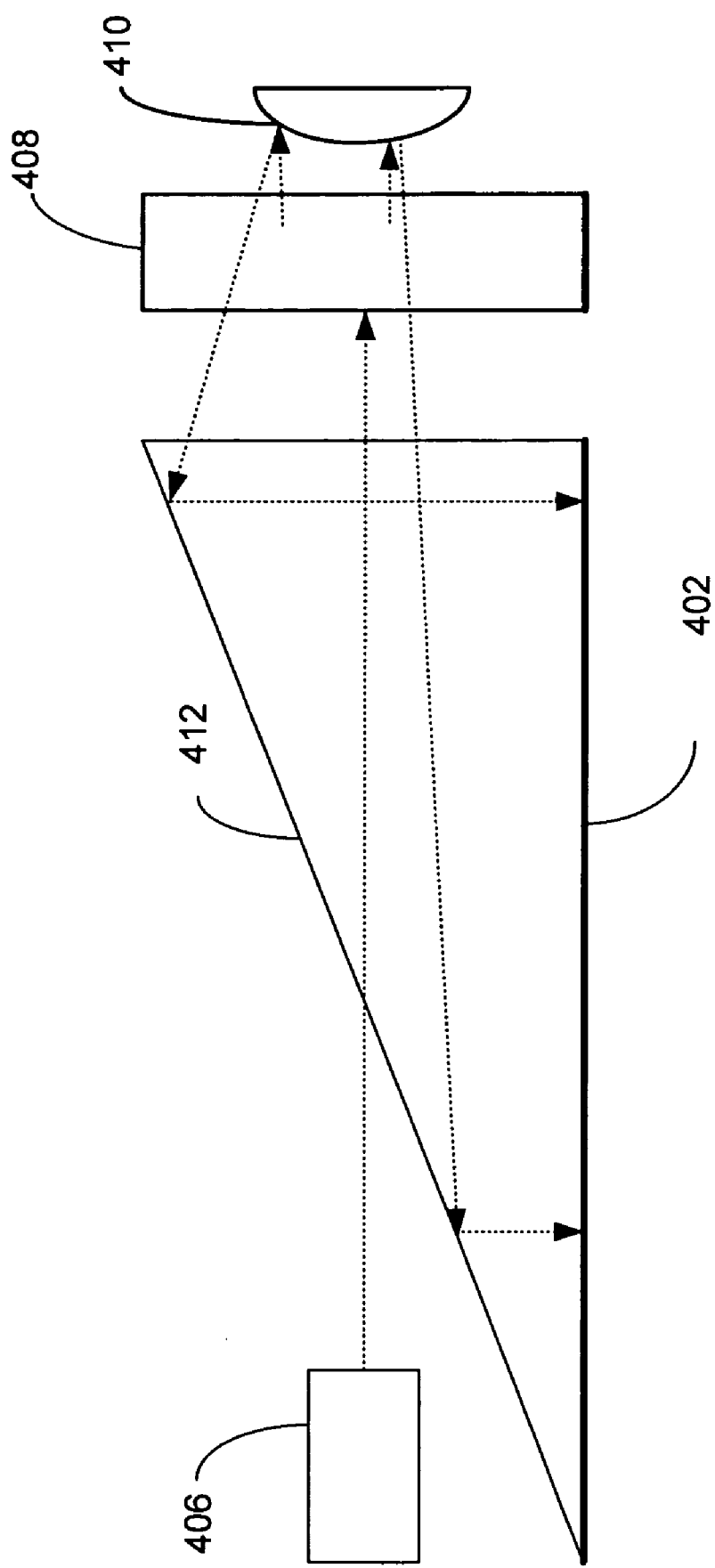
FIG. 5 illustrates a top down view of the projection system of FIG. 4 in accordance with some embodiments.

Each of the anamorphic components 408 and 410 (curved mirrors) may perform two functions. First, each of the anamorphic components 408 and 410 may act as anamorphic lenses to expand or scale the image that is provided by the light valve 406 in two orthogonal directions. Second, because the anamorphic components 408 and 410 are mirrors, they may each contribute to redirecting the image that is projected along the first segment (see ref. 414) of the folded optical path to a second segment (see ref. 416) of the folded optical path. In essence, the anamorphic components 408 and 410 as depicted in FIG. 4 each replaces the two anamorphic lens/mirror combinations depicted in the system 100 of FIG. 1. For example, anamorphic component 408 essentially replaces the anamorphic component 108 and the first mirror 112 of FIG. 1 while anamorphic component 410 replaces the anamorphic component 110 and the second mirror 114 of FIG. 1. FIG. 5 depicts a top down view of the projection system 400 of FIG. 4.

Note that in various other embodiments, one of the anamorphic components 408 and 410 depicted in FIGS. 4 and 5 may be replaced by one of the lens/mirror combinations or their equivalent as depicted in FIG. 1. For example, in some embodiments, the first anamorphic component 408 may be replaced by anamorphic lens component 108 and first mirror 112. In yet other embodiments, the second anamorphic component 410 may be replaced by anamorphic lens component 110 and second mirror 114.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the embodiments of the present invention. Therefore, it is manifestly intended that embodiments of this invention be limited only by the claims.

What is claimed is:

1. An apparatus, comprising:
   a light valve to project a first image along a first segment of a folded optical path;
   a first anamorphic component located along the first segment of the folded optical path to expand the first image in a first direction to provide a second image, the first direction being substantially orthogonal to the first segment of the folded optical path; and
   a second anamorphic component located on the other side of the first anamorphic component opposite the light valve, to expand the second image in a second direction to provide a third image, the second direction being substantially orthogonal to the first direction and the first segment of the folded optical path.

2. The apparatus of claim 1, wherein the first anamorphic component comprises a first anamorphic lens.

3. The apparatus of claim 2, wherein the second anamorphic component comprises a second anamorphic lens.

4. The apparatus of claim 3, wherein the second anamorphic lens is disposed along a second segment of the folded optical path, and the apparatus further comprises a first mirror disposed on the first segment of the folded optical path after the first anamorphic lens to at least contribute towards redirecting the second image to the second anamorphic lens.

5. The apparatus of claim 4 further comprising a second mirror disposed optically between the first mirror and the second anamorphic lens to further contribute to redirecting the second image to the second anamorphic lens.

6. The apparatus of claim 5 further comprising a display screen, and a third mirror disposed optically between the second anamorphic lens and the display screen to redirect and project the third image provided by the second anamorphic component onto the display screen.

7. The apparatus of claim 1, wherein the first or the second anamorphic component is a curved mirror.

8. The apparatus of claim 1, wherein the first or the second anamorphic component comprises two anamorphic lenses to form a compound lens.

9. The apparatus of claim 1 further comprising one or more illumination sources to illuminate the light valve.

10. An apparatus, comprising:
a light valve, the light valve to project an image along a first segment of a folded optical path, the image having a first aspect ratio;
a first anamorphic component located along the first segment of the optical path to expand the image in a first manner; and
a second anamorphic component located on the other side of the first anamorphic component opposite the light valve, to expand the image in a second manner, the first and second manners being complementary resulting in the twice expanded image having a second aspect ratio that is substantially equal to the first aspect ratio.

11. The apparatus of claim 10, wherein the first anamorphic component comprises a first anamorphic lens.

12. The apparatus of claim 11, wherein the second anamorphic component comprises a second anamorphic lens.

13. The apparatus of claim 12, wherein the second anamorphic lens is disposed along a second segment of the folded optical path, and the apparatus further comprises a first mirror disposed on the first segment of the folded optical path after the first anamorphic lens to at least contribute towards redirecting the expanded image to the second anamorphic lens.

14. The apparatus of claim 13 further comprising a second mirror disposed optically between the first mirror and the second anamorphic lens, the second mirror to further contribute to redirecting the expanded image to the second anamorphic lens.

15. The apparatus of claim 14 further comprising a display screen, and a third mirror disposed optically between the second anamorphic lens and the display screen to redirect and project the twice-expanded image provided by the second anamorphic component onto the display screen.

16. The apparatus of claim 10, wherein at least one of the first or the second anamorphic components is a curved mirror.

17. The apparatus of claim 10, wherein at least one of the first or the second anamorphic components comprises of two anamorphic lenses to form a compound lens.

18. The apparatus of claim 10, wherein the first and second aspect ratios equals to 4:3 or 5:4.

19. In a projection system, a method of operation, comprising:
projecting a first image along a first segment of a folded optical path;
expanding the first image in a first direction to provide a second image, the first direction being substantially orthogonal to the first segment of the folded optical path; and
expanding the second image in a second direction to provide a third image, the second direction being substantially orthogonal to the first direction and the first segment of the folded optical path.

20. The method of claim 19 wherein the first image having a first aspect ratio and the method further comprises projecting the third image onto a display screen, the projected third image having a second aspect ratio, the first and second aspect ratios being substantially equal.

21. The method of claim 20 further comprising redirecting the second image via a second segment of the folded optical path.

22. The method of claim 21 further comprising redirecting the third image to the display screen via a third segment of the folded optical path, the second and third segments being nonparallel.

* * * * *